United States Patent [19]

Itoh et al.

[11] Patent Number: 4,775,568

[45] Date of Patent: Oct. 4, 1988

[54] OPTICAL INFORMATION STORAGE MEDIUM

[75] Inventors: Masaki Itoh; Akio Morimoto, both of Tokyo, Japan

[73] Assignee: NEC Corporation, Japan

[21] Appl. No.: 935,209

[22] Filed: Nov. 26, 1986

[30] Foreign Application Priority Data

Nov. 27, 1985 [JP] Japan .................................. 60-267718

[51] Int. Cl.$^4$ ............................................. G03C 5/04
[52] U.S. Cl. ..................................... 428/64; 428/412; 428/416; 428/432; 428/697; 430/945; 346/135.1
[58] Field of Search ................. 428/65, 688, 689, 432, 428/697, 412, 416, 64; 430/945; 346/76 L, 135.1

[56] References Cited

U.S. PATENT DOCUMENTS

| 4,188,214 | 2/1980 | Kido et al. | 430/494 |
| 4,461,807 | 7/1984 | Mori et al. | 428/913 |
| 4,499,178 | 2/1985 | Wada et al. | 430/945 |

FOREIGN PATENT DOCUMENTS 1205186  9/1986  Japan .................................. 430/945

Primary Examiner—John E. Kittle
Assistant Examiner—Beth A. Bozzelli
Attorney, Agent, or Firm—Laff, Whitesel, Conte & Saret

[57] ABSTRACT

An optical information storage medium comprising a transparent substrate and an information carrying layer positioned on one side of the substrate, wherein the information carrying layer contains at least 30 per cent by volume of tin and at least 15 per cent by volume of cobalt oxide. The information carrying layer may be formed directly on one surface of the substrate.

6 Claims, 1 Drawing Sheet

OPTICAL INFORMATION STORAGE MEDIUM

FIELD OF THE INVENTION

The present invention relates to information storage materials and, more particularly, to an optical information storage medium for having information stored therein by means of a high-energy an optical, electrical or thermal radiation beams such as, typically a laser beam.

BACKGROUND OF THE INVENTION

An optical information storage medium is used for recording information in the form of a series of pits arranged to form a myriad of coaxial, spiral or linear information tracks provided in the record medium. Such an information storage medium is advantageous for implementing an information recording and reproducing disc of the mass storage type for its high storage density as well known in the art.

An information storage medium of this nature is typically provided in the form of a multi-layer structure which consists of a transparent substrate and an information carrying layer of a low-melting point metal deposited on the substrate. As such a low-melting point metal is used, for example, tellurium or bismuth or any alloy containing one or both of these, as disclosed in Japanese Patent Specification No. 54-15483. Similar optical information storage materials are shown in, for example, U.S. Pat. Nos. 3,971,874 and 4,188,214.

From the viewpoint of providing a high degree of optical sensitivity, tin in particular is preferred as a low-melting point metal for use in such an information storage medium. A known information storage medium using tin as a low-melting point metal is however not fully acceptable for achieving information reproducing signals of satisfactory quality and has not been used for practical purposes.

It is, accordingly, an object of the present invention to provide an improved optical information storage medium which is acceptable for achieving information reproducing signals of satisfactory quality.

SUMMARY OF THE INVENTION

In accordance with the present invention, there is provided an optical information storage medium comprising a substantially transparent substrate and an information carrying layer provided on one side of the substrate, wherein the information carrying layer contains 30 to 85 per cent by volume of tin and 15 to 70 per cent by volume of cobalt oxide. In one preferred embodiment of the present invention, the information carrying layer may be formed directly on one surface of the substrate.

An optical information storage medium proposed by the present invention is characterized, inter alia, in that tin is used in combination with cobalt oxide for forming the information carrying layer of the medium. The tin component of the information carrying layer is advantageous in that it provides a high degree of recording sensitivity for the information storage medium. If, however, the information carrying layer of an optical information storage medium were constructed solely of tin, then the information storage medium could not be used for practical purposes because of the poor surface state of the layer of tin. Such a poor surface state results from the particular crystal structure of a bulk of tin. When tin is used in combination with cobalt oxide for the formation of an information carrying layer and the proportion between the tin and cobalt components of such an information carrying layer is selected as herein specified, the information carrying layer has a significantly improved surface state which enables the information storage medium to provide excellent performance characteristics when used on an optical information recording and reproducing apparatus.

BRIEF DESCRIPTION OF THE DRAWINGS

The drawbacks of a prior-art optical information storage medium of the described general nature and further details of an optical information storage medium according to the present invention will be more clearly understood from the following description taken in conjunction with the accompanying drawings in which like reference numerals designate similar or corresponding structures and elements and in which.

DESCRIPTION OF THE PREFERRED EMBODIMENTS

Figure 1:
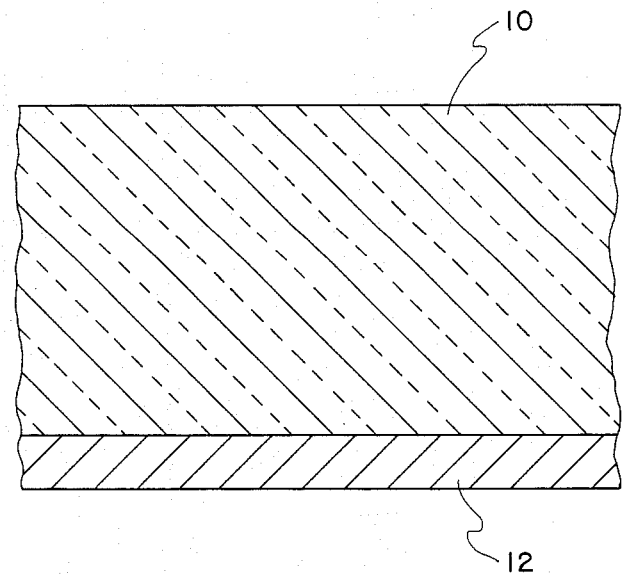
FIG. 1 is a fragmentary sectional view showing the basic construction of a first preferred embodiment of an optical information storage medium according to the present invention.

Referring to FIG. 1 of the drawings, an optical information storage medium embodying the present invention comprises a substantially transparent substrate 10 and and information carrying layer 12 formed on one surface of the substrate 10. The transparent substrate 10 may be constructed of any desired material such as, for example, a syhthetic resin, glass, porcelain. As the synthetic resin may be used an acrylic resin such as polymethyl methacrylate; polycarbonate; polyetherimido; polysulfone; an epoxy resin; or polyvinyl chloride. The substrate 10 is in the form of a circular disc, an elongate tape or an otherwise contoured web. On the surface of such a substrate 10 may be provided a heat insulating layer or a smoothing film if desired, although such an additional layer or film is not shown in the drawings.

In the embodiment of the present invention herein shown, the information carrying layer 12 provided on the transparent substrate 10 is formed of a mixture of tin and cobalt oxide (CoOx). While the information storage medium using such an information carrying layer 12 will provide satisfactory information recording capabilities, a third component substance may be added to the mixture of tin and cobalt oxide to provide further improved weather-proof ability and/or an accurately controlled reflectivity. Examples of such an additional substance include carbon, aluminum, silicon titanium, chromium, iron, cobalt, nickel, copper, zinc, gallium, germanium, selenium, zirconium, niobium, molybdenum, rhodium, palladium, silver, indium, antimony, tellurium, tantalum, tungsten, platinum, lead, bismuth, and gold. If desired, one or more of these substances may be used as a further additional component material of the information carrying layer 12.

In accordance with the present invention, the tin component of the information carrying layer 12 accounts in bulk concentration for about 30 per cent by volume or more of the information carrying layer 12 and the cobalt oxide component of the layer 12 accounts for about 15 per cent by volume of the information carrying layer 12 without respect to the chemical composition of the layer 12, for the reasons which will become apparent as the description proceeds. The bulk concentration of the remainder component or components of the information carrying layer 12 is preferably within the range of from about 10 per cent to 15 per cent of the total bulk of the layer 12 although a high concentration may be used depending upon the resultant physical properties of the layer 12. For providing satisfactory storage sensitivity and satisfactory quality of the signals to be produced from the information storage medium 10, the thickness of the information carrying layer 12 preferably ranges from about 100 angstroms to about 600 angstroms and more preferably from about 200 angstroms to about 500 angstroms.

For the recording of information in the information storage medium thus constructed, a series of pits are formed in the information carrying layer 12 by selective irradiation of the layer 12 with, for example, a laser beam. The pits are arranged to form a multiplicity of coaxial or spiral tracks where the storage medium is provided in the form of a circular disc as herein assumed or along a plurality of linear information tracks where the storage medium is provided in the form of an elongated tape. In order that the information tracks formed by these pits be precisely located on the disc, the substrate 10 of the disc is ordinarily formed with coaxial or spiral guide grooves along which the laser beam is to be incident during reproduction of the information from the disc. The laser beam used for the information reproducing operation is collimated to have a cross sectional area approximately equal in diameter to the width of the guide grooves. When such a laser beam is focussed on one of the guide grooves, the beam is diffracted in the groove. If the spot of the beam incident on the substrate 10 happens to deviate radially from the particular groove, there results a change in the space distribution of the intensity of the diffracted beam. The focus servo system of the reproducing apparatus is arranged to detect such a change in the space distribution of light intensity and controls the beam to be correctly directed at the center line of the guide groove. The guide grooves used for ordinary optical information storage discs are usually about 0.3 micron to 1.2 micron wide and have depths which are approximately equal to one twelfth to one fourth of the wavelength of the laser beam used for the information reproducing operation.

The features and advantages of an optical information storage medium according to the present invention will be more clearly appreciated from the following Examples of the invention.

EXAMPLE I

A centrally apertured transparent substrate of a polycarbonate formed with guide grooves was prepared which measured 15 mm in inside diameter, 130 mm in outside diameter and 1.2 mm in thickness. The substrate was placed within a vacuum deposition chamber which was evacuated to less than $2 \times 10^{-5}$ Torr. Within the chamber were also placed a resistance-heated boat (made of molybdenum) containing a charge of tin and an electron-beam heated crucible containing a charge of cobalt oxide ($Co_3O_4$). Coevaporation techniques were used to have these substances concurrently deposited on the substrate while controlling the deposition rates of the charges with use of a quartz-crystal oscillator thickness monitor. The deposition process was terminated when it was observed that the deposit of the coevaporated tin and cobalt oxide reached a thickness of about 350 angstroms. An optical information storage disc including an information carrying layer of tin and cobalt oxide uniformly deposited on one surface of the transparent polycarbonate substrate was thus obtained.

A number of such information storage discs were experimentally fabricated each following the procedure of Example I with the bulk concentration of cobalt oxide stepwise varied from 0 to 100 per cent by volume to the whole bulk of the information carrying layer. Tests (A) were conducted with these sample discs to determine the reflectivity of each of the discs to a laser beam of an 8300 angstrom wavelength. Tests (B) were further conducted to determine the noise levels of the raw or blank (viz., non-information carrying) sample discs with use of a laser beam of the same wavelength. A set of information was then written into each of the sample discs with a succession of pits formed in the information carrying layer of the disc along the guide grooves in the substrate by irradiation of the disc with a laser beam also having the wavelength of 8300 angstroms. The signals used for the writing of the information has a frequency at 1.25 megahertz (duty 50%). Each of the discs were driven for rotation at a circumferential speed of 5.65 meters per second. Tests (C) were conducted with the resultant information-carrying sample discs to determine the carrier-to-noise ratios (C/N ratios) of the individual discs.

Table 1 demonstrates the results of these tests A, B and C, wherein the figures in the column under the heading "'Noise Level" indicate the results of the tests B and thus refer to the noise levels of the sample discs (numbered 1/1 to 1/10) as determined before information had been written into the discs which are herein referred to as raw or black discs. In Table 1, furthermore, the rightmost column under the heading "Note" refers to the results of evaluation of the discs tested and indicate whether the sample discs are acceptable or "OK" within the purview of the present invention or the discs are unacceptable or "NO" within the purview of the invention. For example, the sample discs numbered ⅓ to ⅛ have been evaluated to be acceptable while the sample discs numbered 1/1, ½, 1/9 and 1/10 have been evaluated to be unacceptable. In table 1, the thickness of each information carrying layer 12 is 350 angstroms.

From the results of the tests A shown in Table 1 it will be seen that there is a tendency that the reflectivities of the discs decrease as the bulk concentrations of the cobalt oxide component in the information carrying layer increases. When the bulk concentration (100 per cent minus $Co_3O_4$ concentration) of the tin component in the information carrying layer is less than 30 per cent by volume, the reflectivity of the disc is short of 15 per cent. In this instance, the focus servo system of the reproducing apparatus could not operate properly to have the laser beam correctly focussed at the center line of the guide groove. On the other hand, the results of the tests B shown in Table 1 indicate that the noise levels of the raw or blank discs decrease abruptly with addition of cobalt oxide to the bulk of tin and are acceptable when the bulk concentration of the cobalt oxide component in an information carrying layer is higher than 15 per cent. From the results of the tests C, it is seen that the recording sensitivities of discs as represented by the C/N ratios of the discs deteriorate when the bulk concentration of the cobalt oxide component is less than 15 per cent and the bulk concentration of the tin component is less than 30 per cent. Thus, the results of the tests A, B and C show that excellent performance characteristics can be achieved by an information storage medium according to the present invention.

TABLE 1

| Sample No. | $Co_3O_4$ Concentration (%) | Reflectivity (%) | Noise Level (dB) | C/N (dB) | Note |
|---|---|---|---|---|---|
| 1/1 | 0 | 44 | −50 | less than 48 | NO |
| 1/2 | 10 | 42 | −53 | less than 48 | NO |
| 1/3 | 15 | 46 | less than −70 | more than 48 | OK |
| 1/4 | 22 | 43 | less than −70 | more than 48 | OK |
| 1/5 | 35 | 28 | less than −70 | more than 48 | OK |
| 1/6 | 45 | 21 | less than −70 | more than 48 | OK |
| 1/7 | 60 | 17 | less than −70 | more than 48 | OK |
| 1/8 | 70 | 15 | less than −70 | more than 48 | OK |
| 1/9 | 75 | 16 | less than −70 | more than 48 | NO |
| 1/10 | 100 | 9 | less than −70 | more than 48 | NO |

Sample discs were further fabricated with the thickness of the information carrying layer varied from one of the discs to another. Table 2 shows the results of the tests A, B and C.

TABLE 2

| Sample No. | $Co_3O_4$ Concentration (%) | Thickness (Å) | Reflectivity (%) | Noise Level (dB) | C/N (dB) | Note |
|---|---|---|---|---|---|---|
| 2/1 | 27 | 250 | 26 | less than −70 | more than 48 | OK |
| 2/2 | 20 | 400 | 45 | less than −70 | more than 48 | OK |

EXAMPLE II

A transparent substrate was prepared and was placed within a vacuum deposition chamber as in Example I. Within the chamber were also placed a resistance-heated boat containing a charge of tin and an electron-beam heated crucible containing a charge of cobalt oxide ($Co_2O_3$). Coevaporation techniques were used to have these substances concurrently deposited on the substrate.

Table 3 shows the results of tests A, B and C.

TABLE 3

| Sample No. | $Co_2O_3$ Concentration (%) | Thickness (Å) | Reflectivity (%) | Noise Level (dB) | C/N (dB) | Note |
|---|---|---|---|---|---|---|
| 3/1 | 20 | 250 | 20 | less than −70 | more than 48 | OK |
| 3/2 | 25 | 350 | 28 | less than −70 | more than 48 | OK |
| 3/3 | 50 | 450 | 24 | less than −70 | more than 48 | OK |

EXAMPLE III

A transparent substrate was prepared and was placed within a vacuum deposition chamber as in Example 1. Within the deposition chamber were also placed a resistance-heated boat containing a charge of tin, a first electron-beam heated crucible containing a charge of cobalt oxide ($Co_3O_4$) and a second electron-beam heated crucible containing a charge of chromium. Coevaporation techniques were used to have these substances concurrently deposited on the substrate to bulk concentrations of 60 per cent, 35 per cent and 5 per cent by volume for the tin, cobalt oxide and chromium components, respectively. As optical information storage disc was thus obtained, including an information carrying layer of tin, cobalt oxide and chromium uniformly deposited on one surface of the transparent acryl disk substrate. The thickness of the information carrying layer was about 400 angstroms. Information was written into this disc whereupon tests C were conducted with the resultant information-carrying disc to determine the C/N ratio of the disc as in Example 1. The results of the tests showed that the disc was acceptable with the C/N ratio of the disc determined to be more than 48 decibels.

EXAMPLE IV

A transparent substrate was prepared and was placed within a vacuum deposition chamber as in Example 1. Within the deposition chamber were also placed a resistance-heated boat containing a charge of tin, a first electron-beam heated crucible containing a charge of cobalt oxide ($Co_3O_4$) and a second electron-beam heated crucible containing a charge of cobalt. Coevaporation techniques were used to have these substances concurrently deposited on the substrate to bulk concentrations of 60 per cent, 35 per cent and 5 per cent by volume for the tin, cobalt oxide and cobalt components, respectively. A single-layer optical information storage disc was thus obtained, including an information carrying layer of tin, cobalt oxide and cobalt uniformly deposited on one surface of the transparent polycarbonate disc substrate. The thickness of the information carrying layer was about 300 angstroms. Information was written into this disc whereupon tests C were conducted with the resultant information-carrying disc to determine the C/N ratio of the disc as in Example 1. The results of the tests showed that the disc was acceptable with the C/N ratio of the disc determined to be more than 48 decibels.

As will have been understood from the foregoing description an optical information storage medium according to the present invention basically comprises a substantially transparent substrate 10 and an information carrying layer 12 positioned on one side of the substrate, wherein the information carrying layer 12 contains 30 to 85 per cent by volume of tin and at least 15 to 70 per cent by volume of cobalt oxide.

The tin component of the information carrying layer 12 is advantageous in that it provides a high degree of recording sensitivity for the information storage medium. If, however, the information carrying layer is constructed solely of tin, the resultant information storage medium could not be used for practical purposes because of the poor surface state of the layer of tin, such a poor surface state resulting from the particular crystal structure of a bulk of tin. When tin is used in combination with cobalt oxide for the formation of the information carrying layer of an information storage medium and the proportion between the tin and cobalt components of such an information carrying layer is selected as herein specified, the information carrying layer has a significantly improved surface state which enables the information storage medium to provide excellent performance characteristics when used on an optical information recording and reproducing apparatus.

The foregoing excellent performance characteristics of the present invention were not deteriorated after locating those samples in the environment of high temperature of 70° C. and high moisture of 80% for a period of 200 hours.

That test shows that the optical information recording medium of the present invention has a good weather resistance.

In view of this excellent weather resistance, the present invention is superior to the material of the copending Patent Application entitled "Optical Information Storage Medium", filed on Aug. 8, 1986 and assigned to the same assignee, in which an optical information carrying layer contains at least 30 per cent by volume of tin and at least 15 per cent by volume of nickel oxide.

What is claimed is:

1. An optical information storage medium comprising a substantially transparent substrate and an information carrying layer positioned on one side of the substrate, wherein said information carrying layer contains 30 to 85 per cent by volume of tin and 15 to 70 per cent by volume of cobalt oxide.

2. An optical information storage medium as set forth in claim 1, in which said information carrying layer further contains an additional material which consists at least one of carbon, aluminum, silicon, titanium, chromium, iron, cobalt, nickel, copper, zinc, gallium, germanium, selenium, zirconium, niobium, molybdeneum, rhodium, palladium, silver, indium, antimony, tellurium, tantalum, tungsten, platinum, lead, bismuth, and gold.

3. An optical information storage medium as set forth in claim 3, in which said additional material accounts for about 10 per cent to about 15 per cent by volume of said information carrying layer.

4. An optical information storage medium as set forth in claim 1, in which said information carrying layer has a thickness with a range of from about 100 angstroms to about 600 angstroms.

5. An optical information storage medium as set forth in claim 1, in which said information carrying layer has a thickness with a range of from about 200 angstroms to about 500 angstroms.

6. An optical information storage medium as set forth in claim 1, in which a said substrate consists of a synthetic resin, glass or porcelain, said synthetic resin being an acrylic resin such as polymethyl methacrylate; poly carbonate; polyetherimido; polysulfone; an epoxy resin; or polyvinyl chloride.

* * * * *